United States Patent [19]

Anders

[11] Patent Number: 5,305,439
[45] Date of Patent: Apr. 19, 1994

[54] METHOD AND APPARATUS FOR TIME-SHARED PROCESSING OF DIFFERENT DATA WORD SEQUENCES

[75] Inventor: Peter Anders, Hamburg, Fed. Rep. of Germany

[73] Assignee: U.S. Philips Corporation, New York, N.Y.

[21] Appl. No.: 616,448

[22] Filed: Nov. 20, 1990

[30] Foreign Application Priority Data

Nov. 25, 1989 [DE] Fed. Rep. of Germany ....... 3939072

[51] Int. Cl.$^5$ .............................. G06F 7/00; G06F 5/06
[52] U.S. Cl. .............................. 395/250; 364/DIG. 1; 364/231.4; 364/239.1; 364/239.2; 364/251; 370/110.1
[58] Field of Search .............................. 395/250, 325; 370/110.1

[56] References Cited

U.S. PATENT DOCUMENTS

| | | | |
|---|---|---|---|
| 4,644,537 | 2/1987 | Gitlin et al. | 370/119 |
| 4,651,320 | 3/1987 | Thapar | 370/119 |
| 4,674,087 | 6/1987 | Green et al. | 370/110.1 |
| 4,683,567 | 7/1987 | Green et al. | 370/110.1 |
| 4,891,806 | 1/1990 | Farias et al. | 370/110.1 |
| 5,099,478 | 3/1992 | Bremer et al. | 370/110.1 |

Primary Examiner—Debra A. Chun
Attorney, Agent, or Firm—Richard A. Weiss

[57] ABSTRACT

Method and apparatus for time-shared processing of a sequence of principal data words having a constant period and at least one secondary word of a second sequence of secondary data words such that there is continuous processing of the secondary data word among said principal data words is formed. A principal data word becomes available for processing at each constant period, and the processing time of such a principal data word is less than that period. After a predetermined number of principal data words first becomes available for processing, the processor begins processing each of the available principal data words such that the next principal data word of the sequence begins processing immediately after processing of the previous principal data word of the sequence is complete. At a certain time after processing begins, an instance is reached where the processor has completed processing of all of the principal data words available for processing and the next principal data word of the sequence has not yet become available for processing. At that instance, at least one of the secondary data words of the second sequence is processed by the processor. Thereafter, processing of the principal data words continues.

25 Claims, 2 Drawing Sheets

METHOD AND APPARATUS FOR TIME-SHARED PROCESSING OF DIFFERENT DATA WORD SEQUENCES

BACKGROUND OF THE INVENTION

1. Field of the Invention

The invention relates to a method for time-shared processing of a sequence of principal data words having a known constant frequency and a sequence of secondary data words having a lower frequency, in which the processing of each principal data word requires a shorter duration than the period of the principal data words. The invention also relates to apparatus for carrying out such method.

2. Description of the Related Art

In particular, a method of this type is carried out by a data processor which processes sample values, digitized as data words, of analog signals or sample values of signals which are already digitally present, which signals are time-dependent. The individual sample values of a signal are processed according to the same program in each case. One particular example of this is the processing of digitized audio signals, derived for instance from a compact disc CD storage medium. Since each of the sample values are subjected to the same algorithm, in the form of an application program in the data processor, the number of instructions which can be executed within a sampling period and the extent of the instructions themselves represent a measure of the performance of the data processor.

In the foregoing case, primary functions, such as volume, balance and treble and bass settings, for example, are executed in the data processor in a foreground program which operates in the case of the CD at a sampling frequency of 44.1 kHz. There are also additional functions in audio systems, which can be referred to as secondary functions owing to their lesser requirements in terms of time. The rate of change of the signals for these secondary functions is considerably less than for the primary functions, so that it is possible to process the former in time gaps which remain within or at the end of a sampling period during the execution of a foreground program for a primary function. An example of such secondary functions are measures for decoding stereo/mono switch-overs or station identifiers in audio systems.

To be able to execute the background programs, it is, therefore, necessary that the sampling period of the foreground program is not completely occupied by instructions of such program. Since the space available for the background program within the sampling period of the foreground program is usually limited, the background program must be divided into a number of suitable sub-programs, each such sub-program then being processed in one of the successive sampling periods following each execution of the foreground program. A start program branch for processing the corresponding sub-program of the background program is carried out at the end of each execution of the foreground program, and a return program branch is carried out at the start of the following execution of the foreground program. The latter is frequently controlled by a corresponding synchronization signal, so that a wait loop exists at the end of the background sub-program to wait for this synchronization signal.

This results in an unfavorable time utilization of the data processor. Moreover, each program branch requires that a number of commands must be provided, for management of the branch addresses in particular, which increases program execution time. This increases proportionately the smaller the background sub-programs are.

SUMMARY OF THE INVENTION

An object of the present invention is to provide a method of the foregoing type in which the time remaining within the constant sampling period after processing of a principal data word can be used as much as possible for the processing of one or more secondary data words.

According to the invention, during the sequence of principal data word, a predetermined number thereof are first temporarily stored, and processing of the directly succeeding data words in such sequence is carried out by processing a stored data word immediately after processing of the respective preceding word has been completed. When all of the stored data words have been processed, processing of one or more secondary data words is then carried out during a contiguous time interval. Processing of the principal data words is then resumed as described.

In this way, the excess time remaining within the program period for processing of a principal data word is accumulated over a plurality of such periods until no unprocessed temporarily stored data word is any longer present, so that a contiguous time interval is formed during which processing of at least one secondary data word can be executed.

The duration of the contiguous time interval is determined by the number of temporarily stored data words and does not need to be utilized fully. Rather, when the processing of at least one of the secondary data words has been completed, no wait cycle need be inserted. Instead, processing of the next principal data word, again from those temporarily stored, can be directly resumed. In general, only a few secondary data words, frequently only one such data word, in each case, is to be processed, and this processing usually does not require much time. Therefore, according to one further aspect of the invention, it is expedient that only one principal data word is stored and the preceding data word is overwritten when a new data word is stored, and that the duration of the contiguous time interval is at most equal to the period of the principal data words. Particularly in the case of audio signal processing, this duration is virtually always sufficient and requires only little memory capacity.

An arrangement for carrying out the method according to the invention includes a program-controlled data processor with an input data terminal for receiving principal data words to be processed and an output data terminal for outputting processed data words, and having control terminals. A first memory is provided for storing a predetermined number of a sequence of principal data words, one input of this first memory being connected to the input data terminal to receive such data words and write them into the first memory with a data word timing. Such input of the first memory is connected to the input data terminal via a first switch controlled by a principle read signal from the data processor. Another input, for the secondary data words, can be connected to the data processor via a second switch controlled by a secondary read signal from such processor. In an arrangement of this type, therefore, only one memory is required, while the control and, in particular, the switch-over from processing of the principal data words to processing of a secondary data word, is carried out directly by the data processor, the writing of, in each case, a principal data word into the first memory being signalled to the latter. Since the processing of the principal data words is carried out asynchronously to their arrival time, the processed data words are normally produced at the output data terminal of the data processor likewise asynchronously to the arriving data words unless a corresponding variable time shift for output of the processed data words is programmed into the data processor. However, this would require additional programming and time outlay. Therefore, a further feature of the arrangement according to the invention is characterized in that a second memory is provided, it being possible to connect one input of this second memory to the output data terminal of the data processor via a third switch controlled by a write signal of the data processor, and it further being possible to provide the processed data words at equal intervals in accordance with the data word timing at one output of the second memory. This second memory largely corresponds to the first memory, resulting overall in a symmetrical arrangement in which the capacity of the second memory corresponds to that of the first memory.

The capacity of the memories can be selected in accordance with the desired contiguous time for processing of one or more of the secondary data words. An expedient further feature of the arrangement according to the invention for carrying out the aforesaid further feature of the method according to the invention is characterized in that at least the first memory stores only one data word in each case, and overwrites the old stored data word when a new data word is stored. This usually produces a sufficient duration for the processing of at least one secondary data word and requires small memories with very simple control.

For different applications, particularly for the processing of digital audio data from a CD, the data words are transmitted bit-serially with a data bit timing. An additional further feature of the invention for this is characterized in that preceding the first memory is a serial-parallel converter which receives the data bits successively at the data bit timing rate and, after receiving the data bits of one data word, in each case, outputs this data word in parallel form to the first memory and generates the data word timing from the data bit timing. The output of the serial-parallel converter then represents the source of the parallel data words. In a corresponding manner, if a second memory is provided, it may be followed by a parallel-serial converter, so that the data words are finally output bit-serially.

When an arrangement or apparatus to the invention is used for digital audio signal processing, stereophonic audio signals are usually assumed, the data words being sampling values of a stereophonic audio signal and consisting of two data part-words in each case, two successive data part-words representing mutually corresponding sampling values of the two stereophonic channels in each case. In order to be able to process these associated data part-words approximately simultaneously in each case, an additional further feature of the arrangement according to the invention is characterized in that at least the first memory consists of two part-memories for one data part-word each, an intermediate memory preceding the one part-memory, in that a first and a second data part-word timing occurs alternately for each second data part-word, and in that with the first data part-word timing the first intermediate memory writes a data part-word, and with the second data part-word timing both first part memories simultaneously write a data part-word. In this manner, both data part-words are available in parallel and can be transferred by the signal processor with directly successive commands. When a second memory is used, it is expedient to construct the latter analogously to the first memory.

BRIEF DESCRIPTION OF THE DRAWINGS

Illustrative embodiments of the invention are described below with reference to the drawings, in which.

DETAILED DESCRIPTION OF THE PREFERRED EMBODIMENTS

Figure 1:
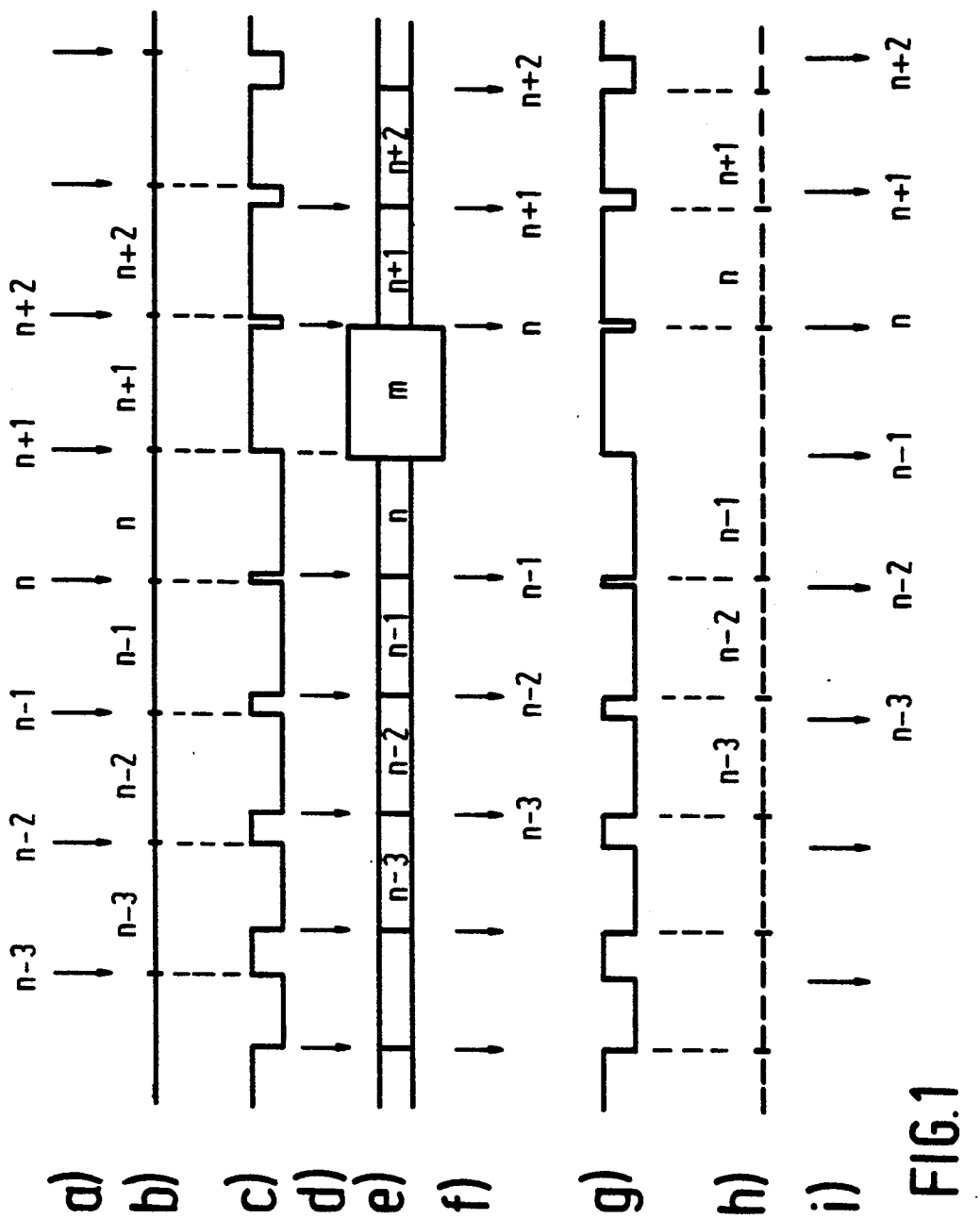
FIG. 1 provides a timing diagram for illustrating the method according to the invention.

FIG. 1 illustrates sequence of processing a number of successive principal data words $n-3$ to $n+2$ as well as a secondary data word m. Row a) designates, with the arrows, the instants at which the principal data words arrive, as well as their numbers, relative to a data word arbitrarily designated n.

Row b) represents the contents of an intermediate memory which receives and temporarily stores the principal data words as they are supplied. It is assumed here that only one data word is temporarily stored, which is overwritten in each case by the following data word supplied.

The time span between the time a data word is written into the intermediate memory and the time this data word is read out and supplied for processing is indicated in the row c), the read instants being indicated by the arrows in the row d). In addition, row c) shows the contents of a flag memory within the processing arrangement which is set with each temporary storage of a new principal data word and is reset when this data word is transferred for processing. As can be seen from FIG. 1, the interval between two successive read instants is shorter than the interval between the arrival of two successive data words. As a result, the interval between the writing and reading of the intermediate memory becomes increasingly shorter for successive data words until the data word n, for which there is virtually no such interval.

The adjacent blocks in row e) are each intended to symbolize the processing of one data word, the designation in the blocks indicating the data word which is being processed during this time. It can be seen here that at the end of processing the data word n, the following data word $n+1$ has not yet arrived so that a switch-over now occurs to processing a secondary data word m. A processing duration of at most the period of the principal data words is available for this, since when the processing of the data word n is completed immediately before the arrival of the following data word $n+1$, although the latter remains in the intermediate memory, it only remains until the arrival of the following data word $n+2$, so that word $n+1$ must be read at least immediately prior to arrival of word $n+2$ and transferred into processing. This is shown in the rows c) and d), where the data word $n+1$ is read and immediately thereafter the following data word $n+2$ is written. The duration of the processing block m is defined by the number and the type of the commands to be executed which are stored therein. It can be seen from the drawing that it is also readily possible for the duration of the processing block m to be shorter. In this case, the next processing block for processing a succeeding secondary data word would then recur after a smaller number of principal data words.

In this manner, the difference between the period of the principal data words and the processing duration is accumulated for successive data words, so that finally a contiguous interval adequate for processing of a second secondary data word is produced; however, the arrival of the principal data words and their processing run asynchronously with respect to one another. This asynchronous execution becomes possible by the use of the intermediate storage. The contiguous duration for processing a secondary data word thus permits a very effective execution of this processing with a low administrative outlay, since the processing of such secondary data words is usually short and can be completed within one period of the principal data words. Otherwise, the processing must be terminated and continued again during the next contiguous period of time for processing a secondary data word, the administrative outlay then required being however, only slight in relation to the total duration of a processing block available for a secondary data word.

The processed data words are output, as shown in row f) in FIG. 1, in each case at the end of the processing of a principal data word. From this it can also be seen that the intervals between the processed data words are firstly not constant and secondly are also shorter than the intervals between the arriving principal data words. In addition, it is frequently desirable for the processed data words to occur synchronously with the data words supplied; only a constant shift by one or more whole data words is permitted.

This is achieved by using temporary storage in an intermediate memory at the output for the processed principal data words, which occur in accordance with the instants in row f) in FIG. 1.

Row h) shows the contents of this intermediate memory. A processed data word is written in each case at an instant specified in row f), and the processed principal data words, temporarily stored at the output, are output synchronously with the instants at which the principal data words to be processed arrive, as indicated in row i).

The signal waveform in row g) shows the interval between reading out of the intermediate memory at the output and the subsequent writing into such memory of the following processed data word, and at the same time represents the state of a flag memory at the output for the processing which is set each time a processed data word is read into or output from the intermediate memory and is reset when the next processed data word is written in. Thus, a new data word can only be written when this signal is high. However, at the end of the processing of the data word n in row e) the signal in row g) is still low, so that the processed data word n cannot yet be output immediately, this taking place only at the end of the processing block m. This can be achieved in a simple manner during the processing in that a processing block for in each case one first data word does not begin with the reading of the new data word, but with the output of the data word last processed. In this way, the processed data word n is thus output only at the end of the processed block m, and emerges as shown in row f).

Figure 2:
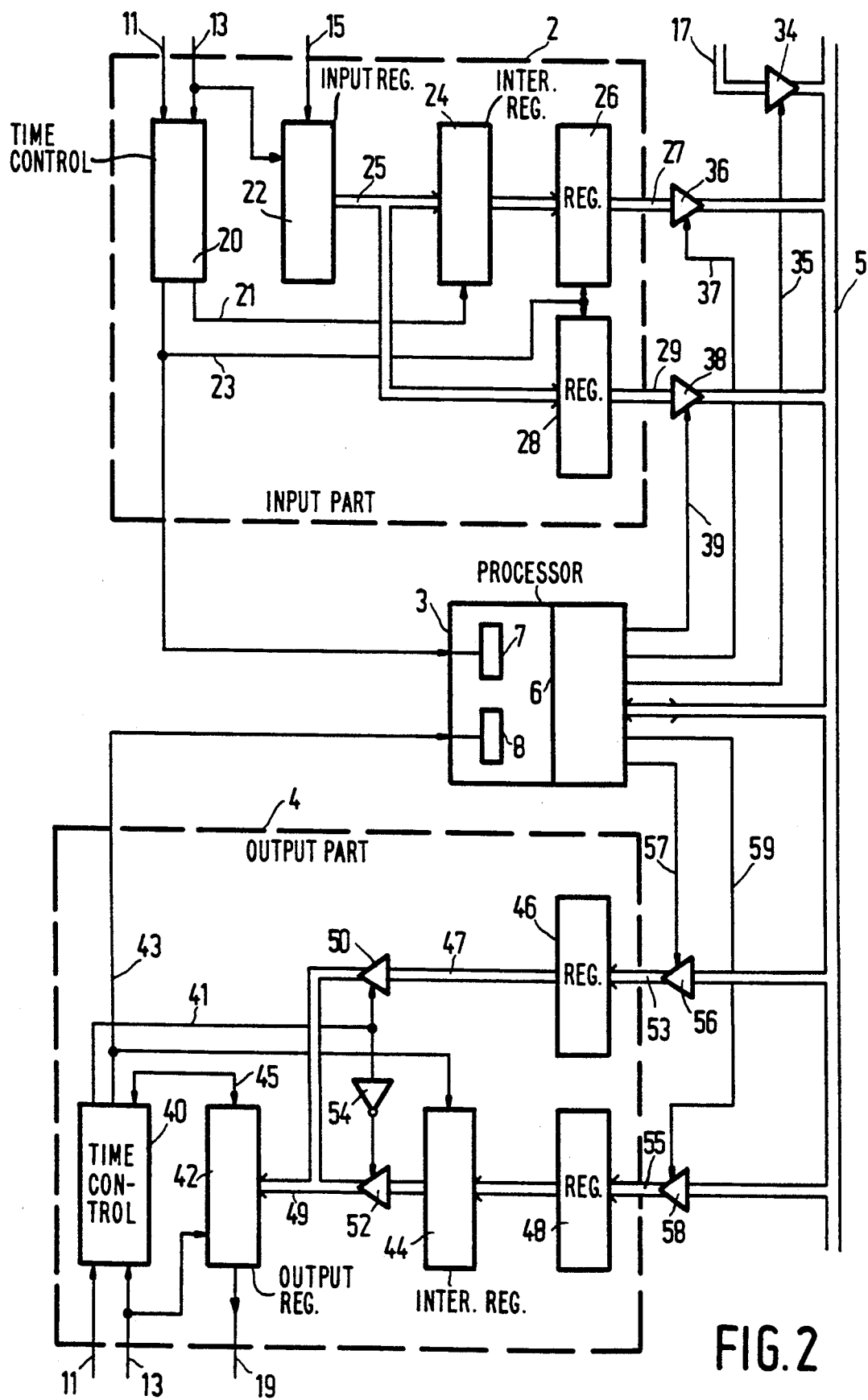
FIG. 2 depicts a block circuit diagram of an arrangement according to the invention with a memory at the input and at the output.

FIG. 2 provides the block circuit diagram of an arrangement for processing digital stereophonic audio signals, which are supplied and output serially, and for also processing secondary data words. This arrangement essentially comprises an input part 2 for serial-parallel conversion and temporary storage of data words, a symbolically represented signal processor 3, as well as an output part 4 with an intermediate memory and a parallel-serial converter. These three parts are interconnected via a data bus 5 by means of controllable switches 36 and 38 or 56 and 58, and in addition an input 17 for secondary data words can be connected to the data bus 5 via a switch 34. The principal series of data words to be processed are supplied bit-serially via an input 15 together with a bit timing signal via the line 13, and are written serially with the bit timing into an input shift register 22 which serves as a serial-to-parallel converter. In each case, a given number of successive bits (in general 16 bits correspond to 2 bytes) form a data part-word and represent one sampling value of one of the two audio channels, and two successive data part-words represent the associated simultaneous sampling values of the two audio channels. The channel to which the simultaneously arriving data bits, or the data part-words formed therefrom belong, is indicated by a channel control signal on the line 11.

Besides being supplied to the input shift register 22, the input 13 for the bit timing signal additionally leads to an input timing controller 20, which also receives the channel control signal via the input 11 and generates a signal on the line 21 or 23 at the end of each data bit sequence forming a data part-word. At the end of the first of two associated data part-words, a signal is generated on the line 21 which is supplied to an intermediate register 24 and writes the data bits, contained at that moment in the input shift register 22, of the first data part-word in parallel form therein from register 22 into intermediate register 24 via the connection 25. At the end of the second data part-word, its bits are provided by register 22 in parallel form at one input of an input register 28 via the connection 25, and the first data part-word in the intermediate register 24 is simultaneously present in parallel form at one input of a further input register 26. Both such data part-words are then transferred into these two input registers 26 and 28 by a signal on the line 23 at the end of the second data part-word. The contents of these input registers are then present in parallel form at the outputs 27 and 29.

The signal on the line 23 is furthermore supplied via a control input to the signal processor 3 and sets there a flag memory 7 in order to notify the signal processor 3 that a complete data word consisting of two data part-words is available in parallel form. As soon as the signal processor 3 completes the processing of a previous associated pair of data part-words, it successively supplies a read signal to the switches 36 and 38 via the lines 37 and 39, as a result of which the switches successively connect the outputs 27 and 29 with the data bus 5, so that the signal processor can process the two stored data part-words directly successively and supply them to the output.

At the same time, the flag memory 7 in the signal processor 3 is then cleared. The principle of this sequence is shown in FIG. 1, rows a) to e), where the instants shown in row a) indicate when the signals are formed on the line 23 in FIG. 2.

If the flag memory 7 is not set (this is the case in FIG. 1 at the end of processing of the data word n) at the end of processing of a pair of data part-words, the signal processor generates a read signal on the line 35 which activates the switch 34 and connects the input 17 to the data bus 5, so that a secondary data word can be transferred into the signal processor 3 in parallel via this input 17 and processed. It is, however, also possible to supply a secondary data word serially to the signal processor 3 via a corresponding separate input, and accordingly a processed secondary data word can be output in parallel form via the data bus 5 or serially via a separate output, which is not shown in greater detail for reasons of simplicity.

After each processing of a pair of data part-words, the signal processor 3 outputs these two data part-words successively via the data bus 5 and generates in each case a write signal on the line 57 or 59, which activate the switches 56 and 58 successively, so that the two data part-words are written into one output register 46 or 48 each via the inputs 53 or 55. These are the instants indicated in the row f) in FIG. 1. At the same time, an output flag memory 8 is reset in the signal processor 3.

In order to output the data part words stored in the output registers 46 and 48 with a timing which is not synchronous with the write signals of the signal processor on the lines 57 and 59, bit-serially successively to a data output 19, an output intermediate register 44, an output shift register 42 and an output timing controller 40 are furthermore provided. The latter likewise receives the data bit timing via the line 13 and the channel control signal via the line 11 and generates therefrom internal control signals on the lines 41, 43 and 45. As a result, the data bits of the processed data words occur at the output 19 synchronously with the data bits of the data words to be processed which arrive at the input 15, during which only a shift by a whole number of data words or pairs of data part-words has occurred.

At the beginning of a pair of data part-words, that is to say at the beginning of the first data part-word, a signal is generated on the lines 43 and 45. With the signal on the line 43, the one data part word is transferred out of the output register 48 into the intermediate register 44, and, from the output register 46, the other data part-word is written with the signal on the line 45 via a connection 47 and a switch 50, which has just been switched to conductive by a corresponding signal on the line 41, and via a connection 49 to a parallel input of the output shift register 42 serving as a parallel-serial converter. Thereafter, this parallel data part-word, bit-serial as a result of the data bit timing at the input 13, is output serially via the output 19.

As a result of the signal on the line 43, the output flag memory 8 is furthermore set in the signal processor 3, for now the output registers 46 and 48 can once again receive one data part-word in each case, since the previous contents have been transferred into the intermediate register 44 or into the output register 42. The signal on the line 43 thus occurs at the instants indicated in FIG. 1, row i).

At the end of the first data part-word, a signal is generated once more on the line 45, and additionally the signal on the line 41 is switched to conductive via the inverter 54 and the second data part-word from the intermediate register 44 is supplied to the parallel input of the output register 42, and is written therein owing to the signal on the line 45. The second data part-word with the data bit timing at the input 13 is now output bit-serially via the output 19.

By using the input registers 26 and 28, therefore, it is possible during the processing of regularly arriving primary data words to accumulate the time difference between the period of the arrival of these data words and their processing duration over successive primary data words, the arrival of such data words and their processing being carried out asynchronously with respect to one another so that after a number of such data words, which depends on the aforesaid time difference, a contiguous period of time is available for processing a secondary data word.

The intermediate registers 24 and 44 have been used in this example only because it concerns the processing of stereophonic digital audio signals. It is readily evident that, particularly when using a plurality of input registers analogous to the registers 26 and 28, which must be connected in series in the data path and would hence permit the temporary storage of a plurality of data words, a longer processing block is possible for one or more secondary data words. Accordingly, numerous and varied other arrangements will occur to those skilled in the art while practicing the principles of the present invention whether in the form of a method or apparatus for processing in accordance therewith as defined in the appended claims.

I claim:

1. A method of providing time-shared processing of a first sequence of principal data words having a predetermined constant period and a second sequence of secondary data words having a second period which is longer than said predetermined constant period, processing time of each of the principal data words being shorter than said predetermined constant period, the method comprising the steps of:
   storing principal data words of said first sequence in a memory;
   reading-out and processing each of the principal data words stored in said memory, each of the principal data words stored in said memory being sequentially and immediately processed as it is read-out from said memory; and
   processing at least one of the secondary data words when said memory is absent of any principal data words which have not yet been processed;
   wherein there is continuous processing of the at least one of the secondary data words among principal data words.

2. A method of providing time-shared processing of a first sequence of principal data words having a predetermined constant period and a second sequence of secondary data words having a second period which is longer than said predetermined constant period, processing time of each of the principal data words being shorter than said predetermined constant period, the method comprising the steps of:
   sequentially storing each of the principal data words in accordance with said first sequence in a first memory at said predetermined constant period;
   sequentially reading-out and processing each of the principal data words stored in said first memory in accordance with said first sequence immediately upon completion of the processing of the preceding principal data word of said first sequence; and
   processing at least one of the secondary data words when said first memory is absent of any principal data words which have not yet been processed;

wherein the reading-out and processing of each of the principal data words stored in said first memory is suspended during the processing of the at least one of the secondary data words.

3. The method as claimed in claim 2, wherein the reading-out and processing of each of the principal data words stored in said first memory does not commence for a first time until after a predetermined number of the principal data words are initially stored in said first memory.

4. The method as claimed in claim 2, further comprising the additional steps of:
sequentially storing each of the principal data words which have been processed in accordance with said first sequence immediately upon completion of the processing thereof in a second memory; and
sequentially reading-out each of the principal data words stored in said second memory in accordance with said first sequence synchronously with the storage of another principal data word of said first sequence in said first memory.

5. The method as claimed in claim 2, wherein only one of the principal data words is stored in said first memory at a time, each of the principal data words stored in said first memory being overwritten by the next principal data word of said first sequence.

6. The method as claimed in claim 5, wherein processing time of the at least one of the secondary data words is at most equal to said predetermined constant period.

7. The method as claimed in claim 5, wherein a time interval exists between the reading-out of each of the principal data words stored in said first memory and the storing of the next principal data word of said first sequence in said first memory, said time interval increasing as each of the principal data words stored in said first memory is read-out until the processing of the at least one of the secondary data words begins; and the processing of the at least one of the secondary data words occurs during said time interval.

8. A method of providing time-shared processing of a first sequence of principal data words having a predetermined constant period and a second sequence of secondary data words having a second period which is longer than said predetermined constant period, processing time of each of the principal data words being shorter than said predetermined constant period, the method comprising the steps of:
sequentially storing each of the principal data words in accordance with said first sequence in a memory at said predetermined constant period;
sequentially reading-out and processing each of the principal data words stored in said memory in accordance with said first sequence immediately upon completion of the processing of the preceding principal data word of said first sequence, whereby a time interval between the reading-out of each of the principal data words stored in said first memory and the storing of the next principal data word of said first sequence in said memory is increasing;
interrupting the reading-out and processing of each of the principal data words stored in said first memory when said time interval becomes at least adequate for processing at least one of the secondary data words, and processing that at least one of the secondary data words during said time interval; and
resuming the reading-out and processing of each of the principal data words stored in said memory upon completion of the processing of the at least one of the secondary data words.

9. The method as claimed in claim 8, wherein said time interval is at most equal to said predetermined constant period.

10. An apparatus for providing time-shared processing of a first sequence of principal data words having a predetermined constant period and a second sequence of secondary data words having a second period which is longer than said predetermined constant period, processing time of each of the principal data words being shorter than said predetermined constant period, the apparatus comprising:
memory means for storing principal data words of said first sequence; and
processing means for
(a) reading-out and processing the principal data words stored in said memory means, each of the principal data words stored in said memory means being sequentially and immediately processed as it is read-out from said memory means; and
(b) obtaining and processing at least one of the secondary data words when said memory means is absent of any principal data words which has not yet been processed;
so as to provide continuous processing of the at least one of the secondary data words among principal data words.

11. An apparatus for providing time-shared processing of a first sequence of principal data words having a predetermined constant period and a second sequence of secondary data words having a second period which is longer than said predetermined constant period, processing time of each of the principal data words being shorter than said predetermined constant period, the apparatus comprising:
first memory means for sequentially storing each of the principal data words in accordance with said first sequence at said predetermined constant period;
processing means for processing data words;
first switching means coupled between said first memory means and said processing means, said first switching means being adapted to enable, upon actuation, said processing means to read-out each of the principal data words stored in said first memory means;
second switching means coupled to said data processing means, said second switching means being adapted to supply, upon actuation, at least one of the secondary data words to said processing means;
wherein said processing means is further adapted to
(a) actuate said first switching means and sequentially read-out and process each of the principal data words stored in said first memory means in accordance with said first sequence immediately upon completion of processing of the preceding principal data word of said first sequence;
(b) actuate said second switching means and obtain and process the at least one of the secondary data words when said first memory means is absent of any principal data words which has not yet been processed; and
(c) cease actuation of said first switching means and suspend reading-out and processing of each of the principal data words stored in said first memory means during processing of the at least one of the secondary data words.

12. The apparatus as claimed in claim 11, wherein said processing means does not actuate said first switching means and begin reading-out and processing of each of the principal data words stored in said first memory means a first time until after a predetermined number of principal data words are stored in said first memory means.

13. The apparatus as claimed in claim 11, further comprising:
   second memory means for sequentially storing each of the principal data words which have been processed in accordance with said first sequence immediately upon completion of processing thereof by said processing means; and
   read-out means for sequentially reading-out each of the principal data words stored in said second memory means in accordance with said first sequence in synchronism with storage of another principal data word of said first sequence in said first memory means.

14. The apparatus as claimed in claim 11, wherein said first memory means is capable of storing only one of the principal data words at a time, each of the principal data words stored in said first memory means being overwritten by the next principal data word of said first sequence.

15. The apparatus as claimed in claim 11, further comprising a serial-parallel converter coupled to said first memory means; and wherein each of the principal data words has a given number of successive bits which arrive at said converter bit-serially, and said converter converts the bits of each of the principal data words into parallel form and supplies them in parallel to said first memory means for storage therein.

16. The apparatus as claimed in claim 15, wherein each of the principal data words is a sample value of a stereophonic audio signal and includes two successive data part-words which represent mutually corresponding sample values of two stereophonic channels; and said first memory means includes a first part-memory and a second part-memory, each of which respectfully stores one of the two successive data part-words.

17. The apparatus as claimed in claim 16, wherein said first memory means is capable of storing only one of the principal data words at a time, each of the principal data words stored in said first memory means being overwritten by the next principal data word of said first sequence.

18. The apparatus as claimed in claim 16, further comprising:
   means for producing first and second timing signals; and
   first intermediate memory means for receiving and storing one of the two successive data part-words;
   wherein said first timing signal causes one of the two successive data part-words to be written into said first intermediate memory means and said second timing signal simultaneously causes the data part-word written into said first intermediate memory means to be written into said first part-memory and the other of the two successive data part-words to be written into said second part-memory.

19. The apparatus as claimed in claim 16, further comprising a serial-parallel converter coupled to said first memory means; and wherein each of the principal data words has a given number of successive bits which arrive at said serial-parallel converter bit-serially, and said serial-parallel converter converts the bits of each of the principal data words into parallel form and supplies them in parallel to said first memory means for storage therein.

20. The apparatus as claimed in claim 19, further comprising;
   means for producing first and second timing signals; and
   first intermediate memory means for receiving and storing one of the two successive data part-words;
   wherein said first timing signal causes one of the two successive data part-words to be written into said first intermediate memory means and said second timing signal simultaneously causes the data part-word written into said first intermediate memory means to be written into said first part-memory and the other of the two successive data part-words to be written into said second part-memory.

21. The apparatus as claimed in claim 20, further comprising:
   second memory means for sequentially storing each of the principal data words which have been processed in accordance with said first sequence immediately upon completion of processing thereof by said processing means; and
   read-out means for sequentially reading-out each of the principal data words stored in said second memory means in accordance with said first sequence in synchronism with storage of another principal data word of said first sequence in said first memory means.

22. The apparatus as claimed in claim 21, wherein said second memory means comprises a third part-memory and a fourth part-memory, each of which respectfully stores one of the two successive data part-words of one of the principal data words which has been processed; and said read-out means comprises a parallel-serial converter coupled to said second memory means, said parallel-serial converter converts the bits of each of the two successive data-part words of one of the principal data words which has been processed into serial form and outputs them.

23. The apparatus as claimed in claim 22, wherein said read-out means further comprises:
   means for producing third and fourth timing signals; and
   second intermediate memory means for receiving and storing one of the two successive data part-words of one of the principal data words which has been processed;
   wherein said third timing signal causes the data part-word stored in said third part-memory to be written into said second intermediate memory means and said fourth timing signal simultaneously causes said data part-word written into said second intermediate memory means to be output serially together with the other data part-word stored in said fourth part-memory.

24. The apparatus as claimed in claim 20, wherein said first memory means is capable of storing only one of the principal data word at a time, each of the principal data words stored in said first memory means being overwritten by the next principal data word of said first sequence.

25. An apparatus for providing time-shared processing of a first sequence of principal data words having a predetermined constant period and a second sequence of secondary data words having a second period which is longer than said predetermined constant period, processing time of each of the principal data words being shorter than said predetermined constant period, the apparatus comprising:

- memory means for sequentially storing each of the principal data words in accordance with said first sequence at said predetermined constant period;
- processing means for processing data words;
- first switching means coupled between said memory means and said processing means, said first switching means being adapted to enable, upon actuation, said data processing means to read-out each of the principal data words stored in said memory means;
- second switching means coupled to said data processing means, said second switching means being adapted to supply, upon actuation, at least one of the secondary data words to said processing means;
- wherein said processing means is further adapted to
  - (a) actuate said first switching means and sequentially read-out and process each of the principal data words stored in said memory means in accordance with said first sequence immediately upon completion of processing of the preceding principal data word of said first sequence, whereby a time interval between reading-out of each of the principal data words stored in said memory means and storing of the next principal data word of said first sequence is increasing;
  - (b) cease actuation of said first switching means and suspend reading-out and processing of each of the principal data words stored in said first memory means when said time interval becomes at least adequate for processing the at least one of the secondary data words, and actuate said second switching means and obtain and process the at least one of the secondary data words during said time interval; and
  - (c) resume actuation of said first switching means and reading-out and processing of each of the principal data words stored in said memory means upon completion of processing of the at least one of the secondary data words.

* * * * *